Oct. 17, 1950                E. N. HARNISH ET AL                    2,526,131
                       BORING ATTACHMENT FOR POWER SAWS
Filed July 21, 1948                                          2 Sheets-Sheet 1
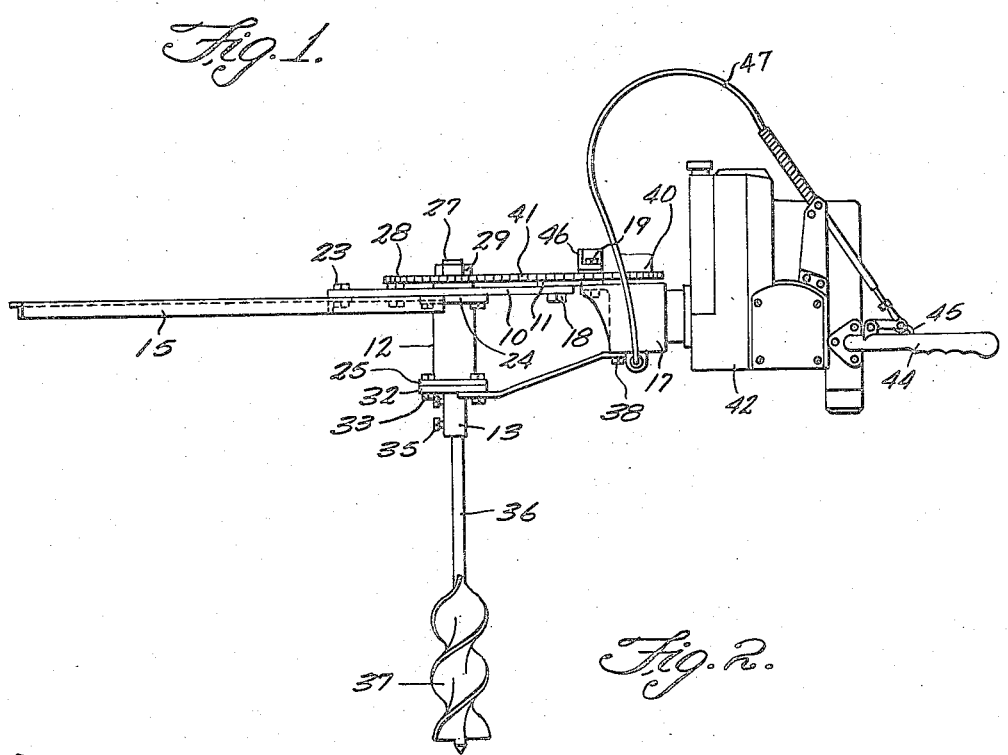
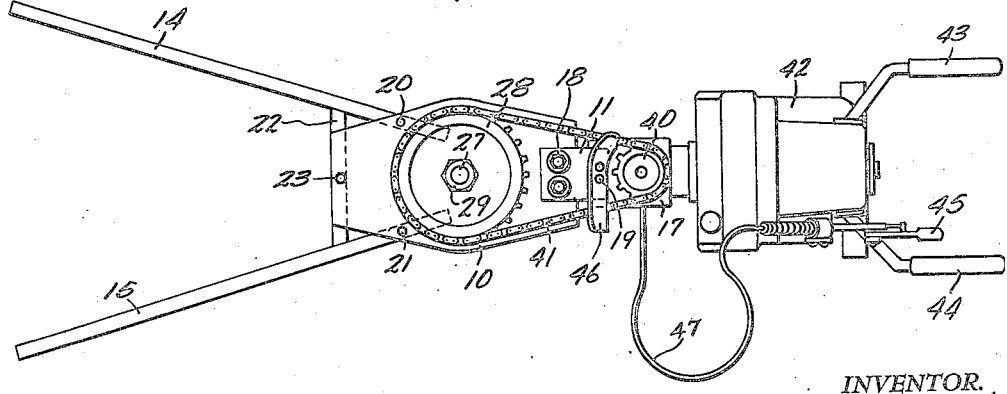
INVENTOR.
Edwin N. Harnish,
John W. Manly,
BY Victor J. Evans & Co.
ATTORNEYS Oct. 17, 1950     E. N. HARNISH ET AL     2,526,131
BORING ATTACHMENT FOR POWER SAWS
Filed July 21, 1948     2 Sheets-Sheet 2
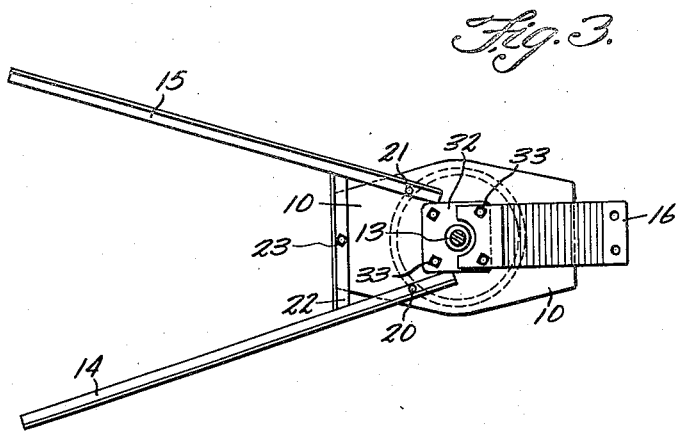
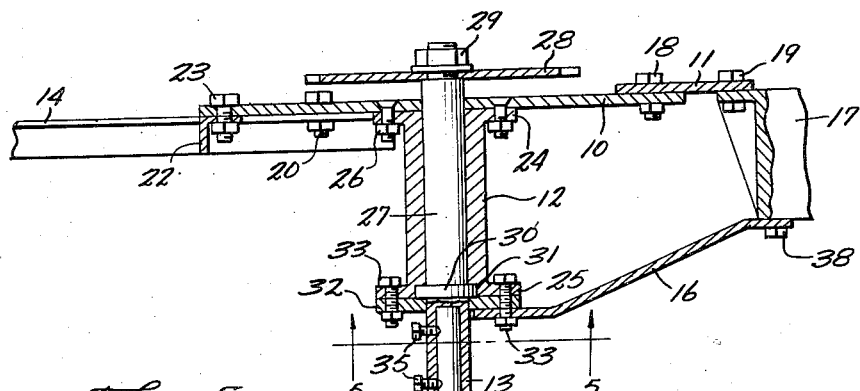
INVENTOR.
Edwin N. Harnish,
John W. Manly,
BY Victor J. Evans & Co.
ATTORNEYS Patented Oct. 17, 1950

2,526,131

UNITED STATES PATENT OFFICE 2,526,131

BORING ATTACHMENT FOR POWER SAWS

Edwin N. Harnish and John W. Manley,
Parksville, British Columbia, Canada

Application July 21, 1948, Serial No. 39,836

3 Claims. (Cl. 144—92)

This invention relates to boring attachments particularly adapted for boring chain holes in boom sticks when setting up a boom of logs, and in particular an attachment for mounting an auger or boring tool on a power saw.

The purpose of this invention is to provide an attachment whereby a power saw of the portable type may readily be converted into a boring tool adapted for boring holes in logs and the like.

In setting up a boom of logs the boom sticks are bored with relatively large holes to provide chain holes. Various types of steam, air and electric augers have been used for this purpose but the machines now in use kick and often throw the operators into the water when boring holes in logs in the water, and when not used for boring this comparatively costly equipment is idle. With this thought in mind this invention contemplates an attachment by which an auger may be operatively mounted on a power saw of the chain saw type with the chain saw and blade removed.

The object of this invention is, therefore, to provide means for readily attaching an auger to the head of a power chain saw with the chain saw removed wherein the machine is adapted to be used for boring.

Another object of the invention is to provide a boring attachment for chain saws wherein an auger may be driven by the sprocket of the saw.

Another object of the invention is to provide a boring attachment for power saws by which relatively large holes may be bored in large logs in a comparatively short time.

A further object of the invention is to provide a boring attachment for power saws which is of a simple and economical construction.

With these and other objects and advantages in view the invention consists of the new and useful combination, construction, and arrangement of parts as hereinafter more fully described, set forth in the claims appended hereto, and disclosed in the accompanying drawings forming part hereof, wherein:

Figure 1 is a view showing a side elevation of a power saw head with the boring attachment mounted thereon.

Figure 2 is a plan view of the attachment and saw head as shown in Figure 1.

Figure 3 is a view looking upward toward the under surface of the attachment with the saw head removed.

Figure 4 is a longitudinal section through the attachment with parts broken away.

Figure 5 is a section taken on line 5—5 of Figure 4 showing a coupling plate at the lower end of the bearing housing of the attachment.

Referring now to the drawings wherein like reference characters denote corresponding parts the power saw boring attachment of this invention includes a base plate 10, an adapter plate 11, a bearing 12, a clutch or coupling 13, handles 14 and 15, and a brace bar 16.

The base plate 10 is formed as shown in Figures 2 and 4 with one end connected to a power saw head 17 by the adapter plate 11 and bolts 18 and 19, and the other end connected to the handles 14 and 15 with bolts 20 and 21, and to a cross bar 22 between the handles by a bolt 23. The bearing 12 is provided with flanges 24 and 25 at the ends and the upper end is connected through the flange 24 to the base plate 10 by bolts 26.

A spindle 27 is journaled in the bearing 12 with the large sprocket 28 of the chain saw secured to the upper end by a lock nut 29, and the lower part of the spindle is provided with a collar 30 that is held in an annular recess 31 in the end of the bearing by a flange 32 which is mounted on the flange 25 at the lower end of the bearing by bolts 33. The lower end of the spindle is provided with a socket 34 having set screws 35 therein which forms the coupling or clutch that holds the shank 36 of an auger or drill 37, as indicated by the numeral 13. It will be understood that any suitable chuck or device may be used for securing the auger to the spindle. The brace bar 16 is also held by the bolts 33 and the opposite end is held to the power saw head 17 by bolts 38, as shown in Figure 4.

With the parts arranged in this manner the auger and spindle are rotated by the sprocket 28 and the sprocket is driven from the head 17 by the small sprocket 40 and chain 41. The head 17 is carried by the motor 42 and the motor is provided with handles 43 and 44 and a control lever 45. A chain guide 46 is also provided adjacent the small sprocket and a flexible control rod 47 extends from the control lever 45 to the lower end of the bearing.

With this attachment mounted on a chain saw a portable boring tool is provided and the parts are attached where the blade of the saw has been removed, using the same bolts. The operating chain is also adapted to run on the saw drive sprocket. The parts are therefore, interchangeable so that by changing the elements the device may either be used as a saw or boring tool.

The attachment provides a portable boring tool by which chain holes may be bored in logs or boom sticks with the logs on land or in the water.

This attachment mounted on the housing of a chain saw with the saw and spindle thereof removed provides a power actuated auger with which the motor held by the handles 43 and 44 and with the opposite end held by the handles 14 and 15 is used to bore comparatively large holes, such as holes four inches in diameter and with the machine or attachment used in this manner it is possible to bore as many four inch holes in one-half hour as two men bore in eight hours by hand. Furthermore by using extensions on the auger-shank it is possible to bore holes of this type through eight feet of wood. For this use the auger is held horizontally. By this means boom-sticks can be bored on the water as well as on land.

It will be understood that modifications may be made in the design or arrangement of the parts without departing from the spirit of the invention.

What is claimed is:

1. A boring attachment for power saws comprising a base plate, a bearing housing with flanged ends mounted on and depending from the base plate, a spindle in the bearing housing having a thrust collar thereon, means securing the lower end of the spindle to the lower end of the housing, a tool holding chuck formed in the lower end of the spindle, an adapter plate for attaching the base plate to a chain saw head, a brace bar for attaching the lower end of the housing to the said chain saw head, and handles extending from the base plate.

2. A boring attachment for power actuated chain saws comprising a base plate having handles extending from one end, means connecting the opposite end to the head of a chain saw, a spindle having a collar on the outer surface and a drill shank receiving socket in the lower end positioned perpendicular to the base plate, a bearing depending from the base plate rotatably mounting the spindle therein, means mounting a sprocket on the upper end of the spindle, a flange mounted on the lower end of the bearing holding the spindle therein through the collar, and means supporting the lower end of the bearing from the chain saw head.

3. In a boring attachment for portable power actuated chain saws having a head, the combination, which comprises, a base plate having a spindle opening therethrough, an adapter plate for securing one end of the base plate to the chain saw head, handles extending from the opposite end of the base plate, a bearing with flanged ends and having a centrally disposed opening extended therethrough with a counterbore providing a socket in the lower end, said bearing extended downwardly from the base plate and positioned with the centrally disposed opening therein in registering relation with the spindle opening in the base plate, a spindle having a collar thereon rotatably mounted in the bearing with the collar positioned in the socket, a flange removably mounted on the lower end of the bearing retaining the collar in the socket, said spindle having a tool holding socket in the lower end, and means mounting a sprocket on the upper end of the spindle.

EDWIN N. HARNISH.
JOHN W. MANLEY.

REFERENCES CITED

The following references are of record in the file of this patent:

UNITED STATES PATENTS

| Number | Name | Date |
| --- | --- | --- |
| 295,236 | Doane et al. | Mar. 18, 1884 |
| 1,165,328 | Forbes et al. | Dec. 21, 1915 |
| 1,397,696 | Nelson | Nov. 22, 1921 |
| 1,494,891 | Elfe | May 20, 1924 |
| 1,785,574 | Black | Dec. 16, 1930 |
| 1,802,129 | Vaccari | Aug. 21, 1931 |
| 2,122,611 | Kirby | July 5, 1938 |
| 2,290,197 | Merriman et al. | July 21, 1942 |
| 2,489,772 | Hall | Nov. 29, 1949 |